(12) United States Patent
Becerril et al.

(10) Patent No.: US 9,308,713 B2
(45) Date of Patent: Apr. 12, 2016

(54) METHOD AND APPARATUS FOR ASSEMBLY OF A SATELLITE ANTENNA

(75) Inventors: Aicsa Becerril, San Diego, CA (US); Alex Toh, San Diego, CA (US); Alfred Ebrahim, San Diego, CA (US); Ming Sun, San Diego, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 795 days.

(21) Appl. No.: 13/268,039

(22) Filed: Oct. 7, 2011

(65) Prior Publication Data

US 2013/0087266 A1 Apr. 11, 2013

(51) Int. Cl.
| | |
|---|---|
| *B32B 7/00* | (2006.01) |
| *B44C 1/17* | (2006.01) |
| *B29C 65/00* | (2006.01) |
| *B32B 37/00* | (2006.01) |
| *B32B 38/04* | (2006.01) |
| *B65C 9/18* | (2006.01) |
| *B31F 5/00* | (2006.01) |
| *B65C 9/08* | (2006.01) |
| *B32B 38/18* | (2006.01) |
| *H01Q 1/42* | (2006.01) |
| *H01Q 21/06* | (2006.01) |
| *B29C 65/50* | (2006.01) |
| *B29C 65/78* | (2006.01) |

(Continued)

(52) U.S. Cl.
CPC .............. *B32B 38/1841* (2013.01); *H01Q 1/42* (2013.01); *H01Q 21/065* (2013.01); *B29C 65/5057* (2013.01); *B29C 65/7814* (2013.01); *B29C 65/7844* (2013.01); *B32B 37/12* (2013.01); *B32B 38/10* (2013.01); *H01Q 21/0087* (2013.01)

(58) Field of Classification Search
CPC ................ H01L 2924/00; H01L 21/67; H01L 21/67121; H01L 21/67132; H01L 21/673; H01L 21/67303; H01L 21/67309; H01L 21/6734; B29C 65/00; B29C 65/48; B29C 65/50; B29C 65/5057; B29C 65/78; B29C 65/7802; B29C 65/7805; B29C 65/7808; B29C 65/7811; B29C 65/7814; B29C 65/7841; B29C 65/7844; H01Q 21/0087; H01Q 21/065
USPC ......... 156/60, 71, 91, 92, 230, 233, 235, 239, 156/247, 249, 250, 252, 256, 263, 264, 265, 156/267, 272.2, 273.9, 289, 297, 299, 300, 156/349, 510, 516, 517, 528, 538, 539, 540, 156/541, 556, 559, 563
See application file for complete search history.

(56) References Cited

U.S. PATENT DOCUMENTS 5,406,292 A * 4/1995 Schnetzer et al. ..... 343/700 MS
5,829,121 A * 11/1998 Shoemaker et al. ............ 29/600

(Continued)

*Primary Examiner* — Philip Tucker
*Assistant Examiner* — Brian R Slawski
(74) *Attorney, Agent, or Firm* — K&L Gates LLP

(57) ABSTRACT

A method of assembling a satellite antenna including placing a first layer PCB including an alignment hole on an assembly fixture including an alignment pole, placing a solid foam spacer including an alignment hole on the assembly fixture, pressing the solid foam spacer onto the first layer PCB to adhere the solid foam spacer to the first layer PCB, removing an adhesive carrier film from a reflector patch of a reflector patch sheet including an alignment hole, placing the reflector patch sheet on the assembly feature, pressing the reflector patch sheet onto the solid foam spacer to adhere the reflector patch to the solid foam spacer, and removing a release liner from the top of the reflector patch sheet to remove excess material from the reflector patch sheet.

17 Claims, 9 Drawing Sheets

(51) Int. Cl.
*H01Q 21/00* (2006.01)
*B32B 37/12* (2006.01)
*B32B 38/10* (2006.01)

(56) References Cited

U.S. PATENT DOCUMENTS

| | | | |
|---|---|---|---|
| 5,863,664 A * | 1/1999 | McCormick et al. | 428/500 |
| 5,867,241 A * | 2/1999 | Sampica | G02F 1/1303 349/122 |
| 6,489,924 B2 * | 12/2002 | Pretorius et al. | 343/700 MS |
| 6,947,008 B2 * | 9/2005 | Tillery et al. | 343/824 |
| 2006/0084254 A1 * | 4/2006 | Attarwala | H01L 21/4857 438/584 |
| 2007/0126638 A1 * | 6/2007 | Channabasappa | 343/700 MS |
| 2008/0197477 A1 * | 8/2008 | McLellan | H01L 24/97 257/690 |
| 2009/0058731 A1 * | 3/2009 | Geary et al. | 343/700 MS |
| 2011/0221649 A1 * | 9/2011 | Price et al. | 343/850 |

\* cited by examiner

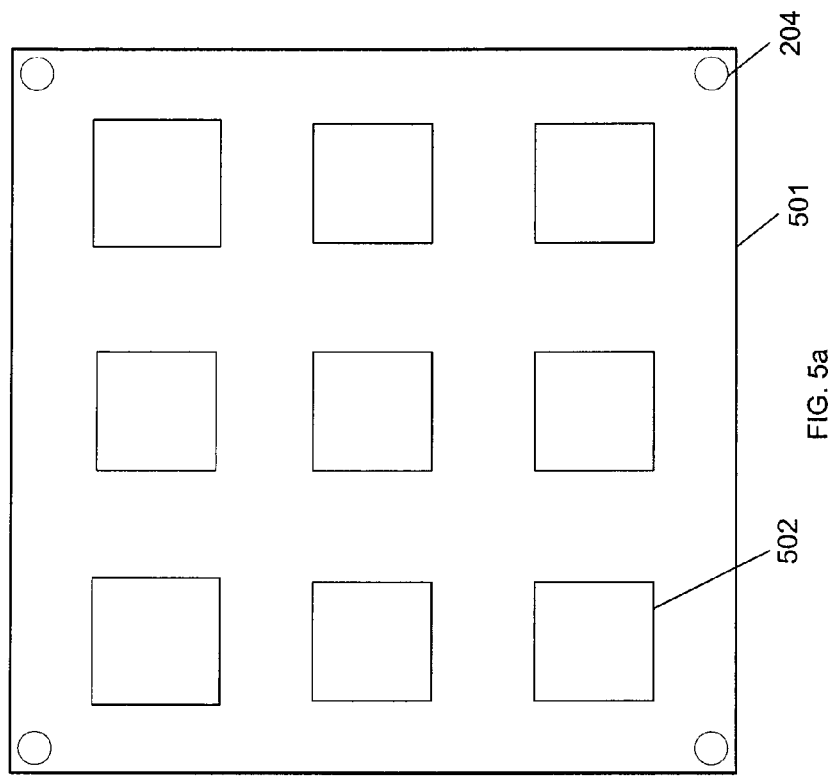 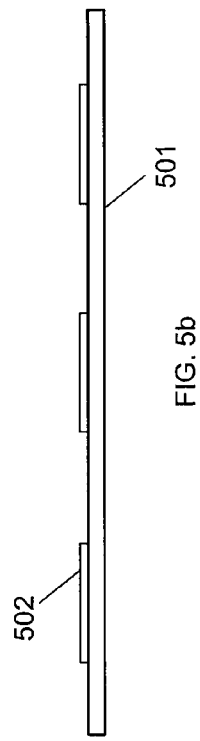
FIG. 5a  FIG. 5b
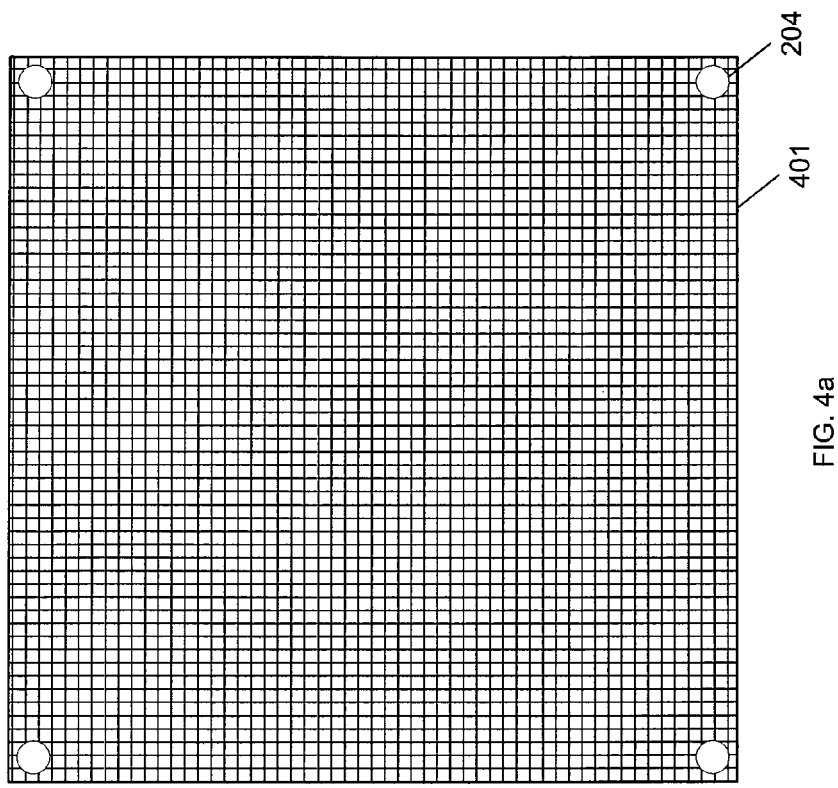 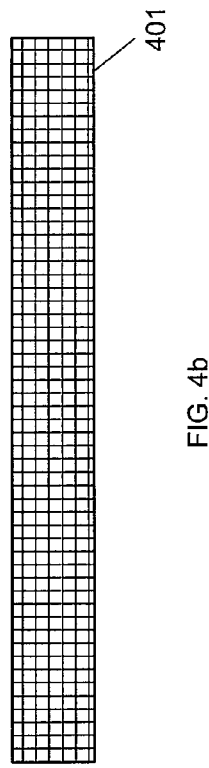
FIG. 4a  FIG. 4b

METHOD AND APPARATUS FOR ASSEMBLY OF A SATELLITE ANTENNA

BACKGROUND

The assembly of satellite antennas may require the use of bosses, screws, washers, or tape, to assemble all of the layers of the antenna to each other. Using these mechanical parts to secure the layers of the antenna may result in degraded antenna performance, and may also necessitate an increase in the size of the antenna to accommodate the parts. The parts may increase the cost of building an antenna.

Having a reflector patch on a satellite antenna PCB made of FR-4, or other substrate material may increase the cost of the antenna and add additional weight to the antenna. The designer of a satellite antenna may need to take into account PCB tolerance and warping.

BRIEF SUMMARY

It is an object of the present invention to provide a method and apparatus for assembly of a satellite antenna.

In accordance with an aspect of the present invention a method of assembling a satellite antenna includes placing a first layer PCB including an alignment hole on an assembly fixture including an alignment pole, placing a solid foam spacer including an alignment hole on the assembly fixture, pressing the solid foam spacer onto the first layer PCB to adhere the solid foam spacer to the first layer PCB, removing an adhesive carrier film from a reflector patch of a reflector patch sheet including an alignment hole, placing the reflector patch sheet on the assembly feature, pressing the reflector patch sheet onto the solid foam spacer to adhere the reflector patch to the solid foam spacer, and removing a release liner from the top of the reflector patch sheet to remove excess material from the reflector patch sheet.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF SUMMARY OF THE DRAWINGS

FIG. 4a depicts an exemplary top view of a solid foam spacer;

FIG. 4b depicts an exemplary cross section of a solid foam spacer;

FIG. 5a depicts an exemplary top view of a first layer PCB with driver patches;

FIG. 5b depicts an exemplary cross section of a first layer PCB with driver patches;

DETAILED DESCRIPTION

A satellite antenna, such as, for example, an IP-65 rated flat plate MSS satellite antenna operating in the L-band or the S-band, may be assembled using multiple layers. For example, the satellite antenna may include reflector patch sheet, a solid foam spacer, a first layer PCB with driver patches, a base plate, and a radome. An assembly fixture may be used to assemble some of the layers of the satellite antenna.

Figure 1:
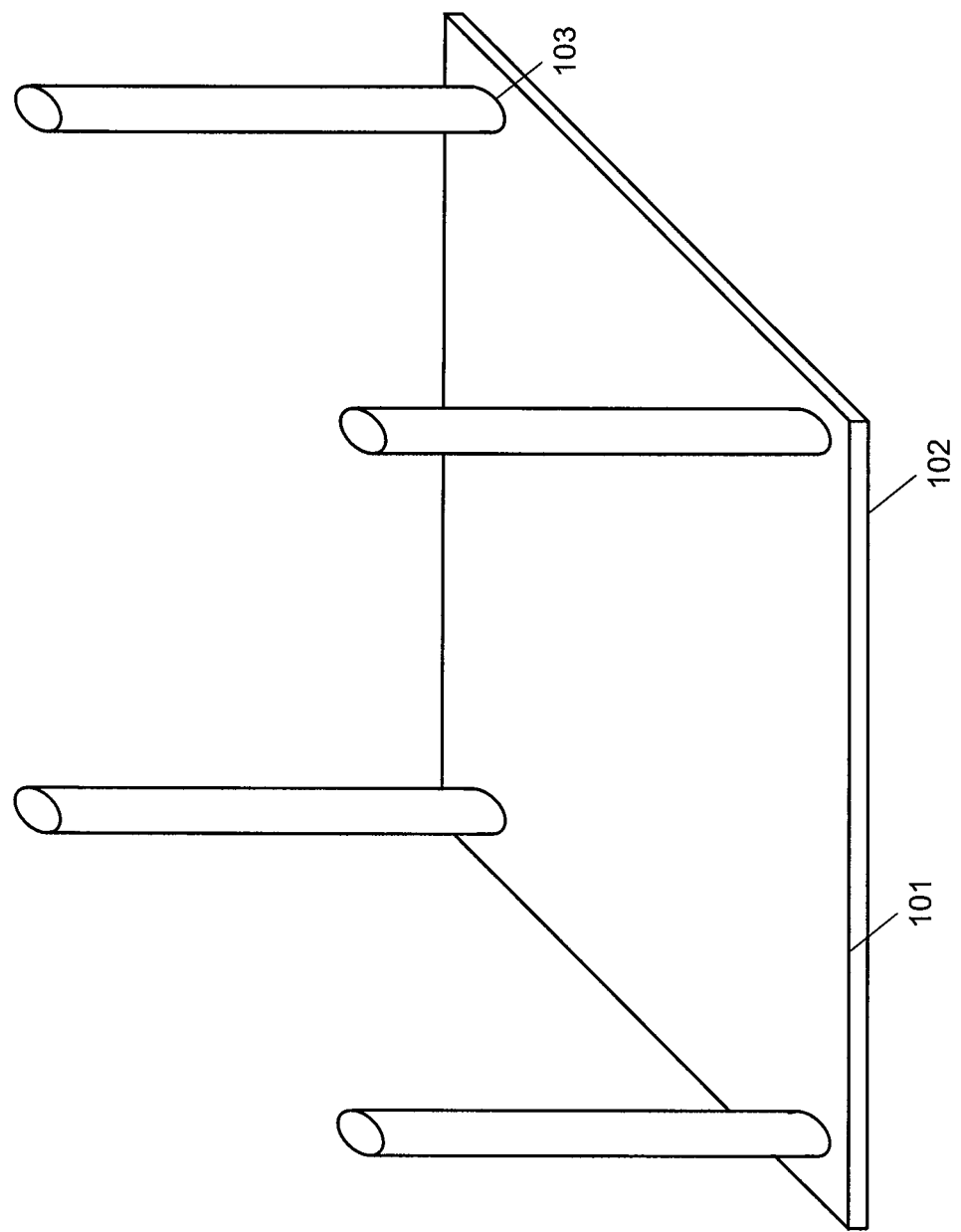
FIG. 1 depicts an exemplary assembly fixture.

FIG. 1 depicts an exemplary assembly fixture. The assembly fixture 101 may include a base 102, and alignment poles 103. The assembly fixture 101 may ensure that precise control of the alignment of the layers of the satellite antenna is maintained during assembly of the satellite antenna.

The base 102 and the alignment poles 103 may be made of any suitable material, such as, for example, wood, metal or plastic. The base 102 may have any suitable number of attached alignment poles 103, and may be in any suitable shape or configuration. For example, the base 102 may be square shaped plastic, with four alignment poles 103, one for each corner. As another example, the base 102 may be a hollow square, and may include material only between the alignment poles 103 to connect the alignment poles 103 to one another. The alignment poles 103 may be arranged on the base 102 in any suitable manner, and may be in any suitable shape. For example, the alignment poles may be circular or triangular. For example, the base 102 may be any shape, and may have a single, triangular alignment pole 103, which may be enough to maintain alignment between layers placed on the assembly fixture 101.

Figure 2:
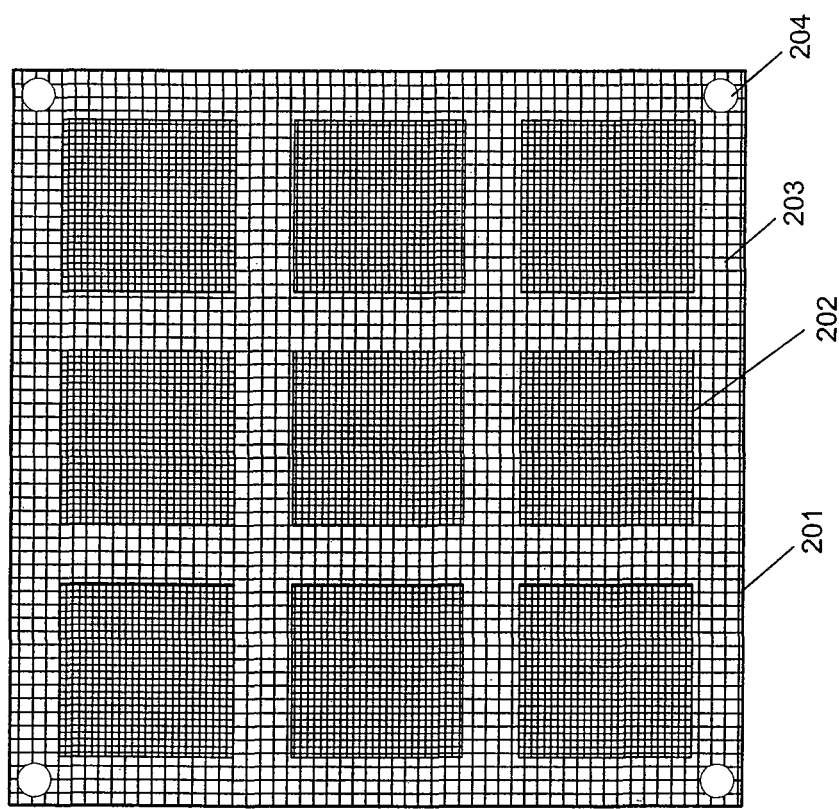
FIG. 2 depicts an exemplary top view of a reflector patch sheet for a satellite antenna.

FIG. 2 depicts an exemplary top view of a reflector patch sheet for a satellite antenna. A reflector patch sheet 201 may be a sheet of any suitable material for a reflector in a satellite antenna. For example, the reflector patch sheet 201 may be a metal or foil sheet of aluminum. Several reflector patches 202 may be precut into the reflector patch sheet 201. Portions of the reflector patch sheet 201 that are not part of any of the reflector patches 202 may be excess material 203. The excess material 203 may be material on the reflector patch sheet 201 that will be removed before construction of the satellite antenna is complete. The reflector patch sheet 201 may also include alignment holes 204, in any suitable alignment for use with the assembly fixture 101.

Figure 3A:
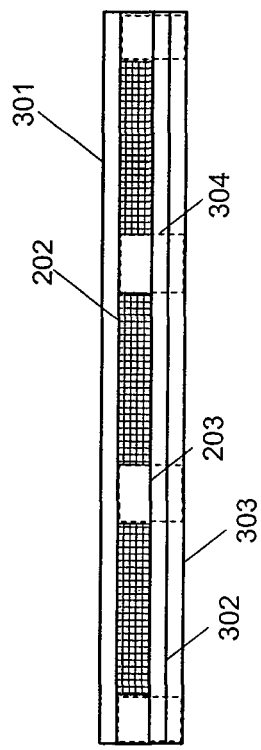
FIG. 3a depicts an exemplary cross section of a reflector patch sheet with release liner and adhesive carrier film attached.

FIG. 3a depicts an exemplary cross section of a reflector patch sheet with release liner and adhesive carrier film attached. A double sided adhesive layer 302 may be attached to the bottom of the reflector patch sheet 201. The adhesive used in the double sided adhesive layer 302 may be any suitable adhesive for adhering to the material of the reflector patch sheet 201 and to a foam material. A different adhesive may be used on each side of the double sided adhesive layer 302. The bottom of the double sided adhesive layer 302 may be covered with an adhesive carrier film 303. The adhesive carrier film 303 may prevent the bottom side of the double sided adhesive layer 302 from adhering to anything until the liner 303 is removed. The shape of the reflector patches 202 may be precut through the double sided adhesive layer 302 and the adhesive carrier film 303, resulting in cut-outs 304, which may include the excess material 203. The top of the reflector patch sheet 201 may covered with a release liner 301. The release liner 301 may protect the reflector patches sheet 201 prior to assembly.

Figure 3B:
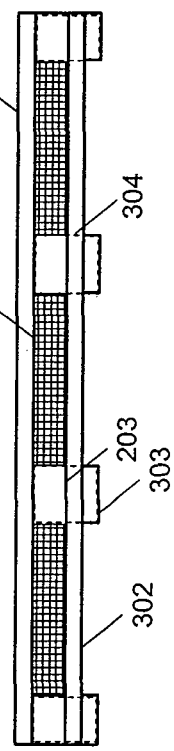
FIG. 3b depicts an exemplary cross section of reflector patch sheet with release liner attached and adhesive carrier film removed from the reflector patches.

FIG. 3b depicts an exemplary cross section of reflector patch sheet with release liner attached and adhesive carrier film removed from the reflector patches. To allow the reflector patches 302 to adhere to the other layers of the satellite antenna, the adhesive carrier film 303 may be removed from portion of the double sided adhesive layer 302 at the bottom of the reflector patches 202. The adhesive carrier film may remain attached to the portions of the double sided adhesive layer 302 that are part of the cut-outs 204.

Figure 3C:
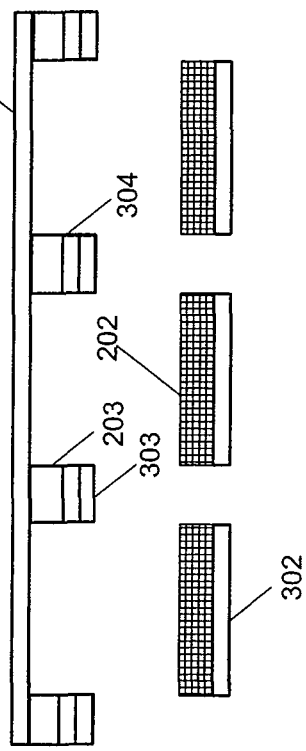
FIG. 3c depicts an exemplary cross section of a reflector patch sheet with release liner removed.

FIG. 3c depicts an exemplary cross section of a reflector patch sheet with release liner removed. When the reflector patch sheet 201 has been assembled with other layers of the satellite antenna on the assembly fixture 101, the release liner 301 may be peeled off of the reflector patch sheet 201. The cut-outs 204 may remain attached to the release liner 301, causing the cut-outs 204, and the excess material 203, to be removed from the reflector patch sheet 201 when the release liner 301 is removed. This may leave only the reflector patches 202, and the portions of the double sided adhesive layer 302 that are adhered to the reflector patches 202, as part of the satellite antenna. The release liner 301 and the material in the cut-outs 203 may be discarded.

FIG. 4a depicts an exemplary top view of a solid foam spacer. A solid foam spacer 401 may be a layer made of any suitable foam material, and may be the same size and shape as the reflector patch 201. The solid foam spacer 401 may include the alignment holes 204, in the same position as on the reflector patch 201, for use with the assembly fixture 101. The bottom of the solid foam spacer 401 may be coated with a double sided adhesive. The top of the solid foam spacer 401 may also include an adhesive that may work in conjunction with, or be used in place of, the adhesive on the bottom of the double sided adhesive layer 302.

FIG. 4b depicts an exemplary cross section of a solid foam spacer. The solid foam spacer 401 may be of any suitable thickness.

FIG. 5a depicts an exemplary top view of a first layer PCB with driver patches. A first layer PCB 501 may include driver patches 502. The first layer PCB 501 may be made of any suitable material, such as, for example, an epoxy laminate such as FR4, and may be printed with a trace feed network of any suitable material, such as, for example copper. The driver patches 502 may be connected to the trace feed network, and may be made of any suitable material, including the same material as the trace feed network. The driver patches 502 may be arranged to be in alignment with the reflector patches 202 when the reflector patch sheet 201 is placed on top of the first layer PCB 501. The first layer PCB 501 may include the alignment holes 204, in the same position as on the reflector patch 201, for use with the assembly fixture 101. The bottom of the first layer PCB 501 may be screen printed to indicate locations for the placement of spacers during the assembly of the satellite antenna, so that fewer spacers may be needed and interference with the trace feed network may be minimized.

FIG. 5b depicts an exemplary cross section of a first layer PCB with driver patches. The driver patches 502 may be very thin, and may be flush with the surface of the first layer PCB 501.

Figure 6A:
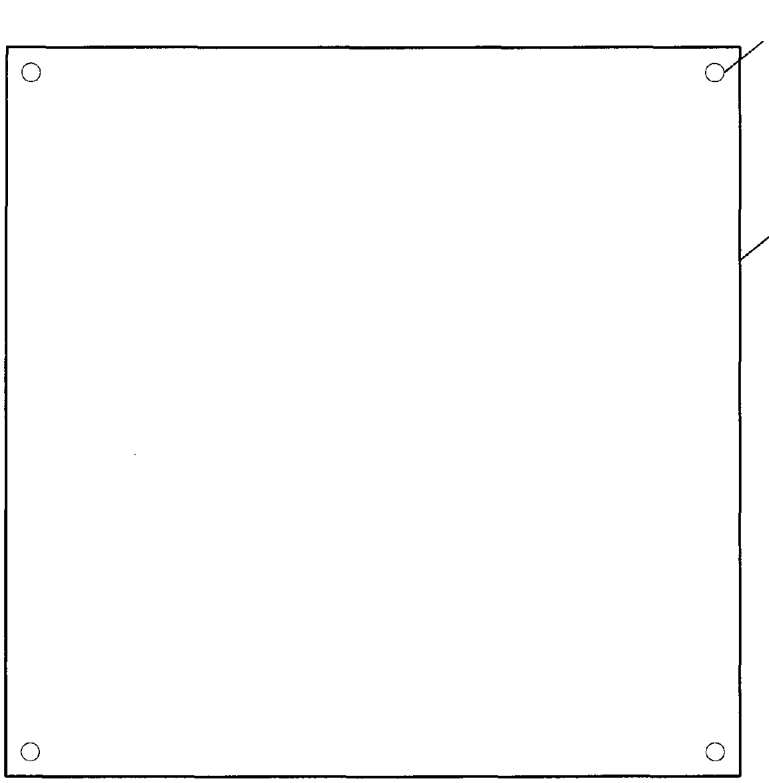
FIG. 6a depicts an exemplary top view of a base plate.

FIG. 6a depicts an exemplary top view of a base plate. A base plate 601 may form the base of the satellite antenna. The base plate 601 may be made of any suitable material, and may be, for example, a metallic ground base plate, and may include screw holes 602 for attaching a radome to the base plate 601. The base plate 601 may also include mounting features, such as, for example, tapping screws, to allow the assembled satellite antenna to be mounted, and an RF cable connector with an O-ring for connecting the assembled satellite antenna to communications equipment.

Figure 6B:
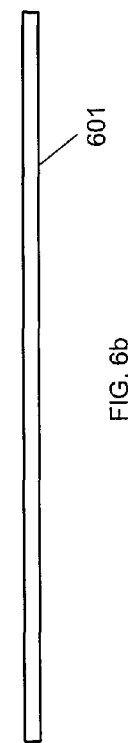
FIG. 6b depicts an exemplary cross section of a base plate.

FIG. 6b depicts an exemplary cross section of a base plate. The base plate 601 may be of any suitable thickness for acting as the ground plate in a satellite antenna.

Figure 7A:
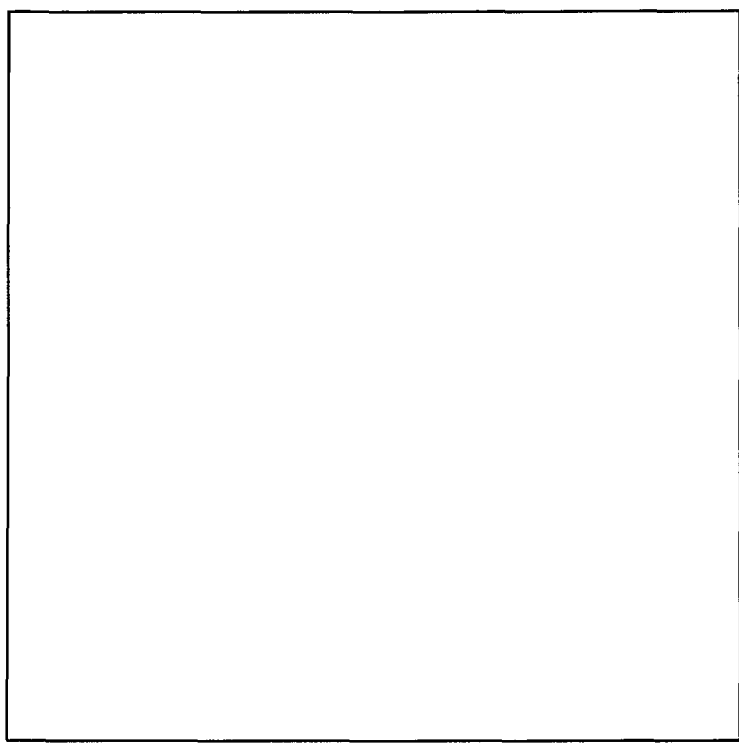
FIG. 7a depicts an exemplary top view of a radome.

FIG. 7a depicts an exemplary top view of a radome. A radome 701 may be a housing of any suitable size and shape for attaching to the base plate 601 and containing the rest of the satellite assembly. For example, the radome 701 may be made of thermoplastic material, such as ABS, or polycarbonate. The radome 701 may include screw holes that line up with the screw holes 602 of the base plate, or the screws used to connect the radome 701 to the base plate 601 may be self-tapping screws. A groove may run around the base of the radome 701, allowing for the installation of a rubber O-ring to seal the connection between the radome 701 and the base plate 601. The use of an O-ring may ensure the assembled satellite antenna is IP-65 rated.

Figure 7B:
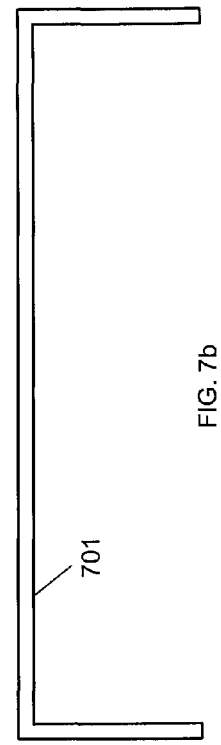
FIG. 7b depicts an exemplary cross section of a radome.

FIG. 7b depicts an exemplary cross section of a radome. The radome 701 may be tall enough to house the first layer PCB 501, the solid foam spacer 301, and the driver patches 202 stacked together.

Figure 8:
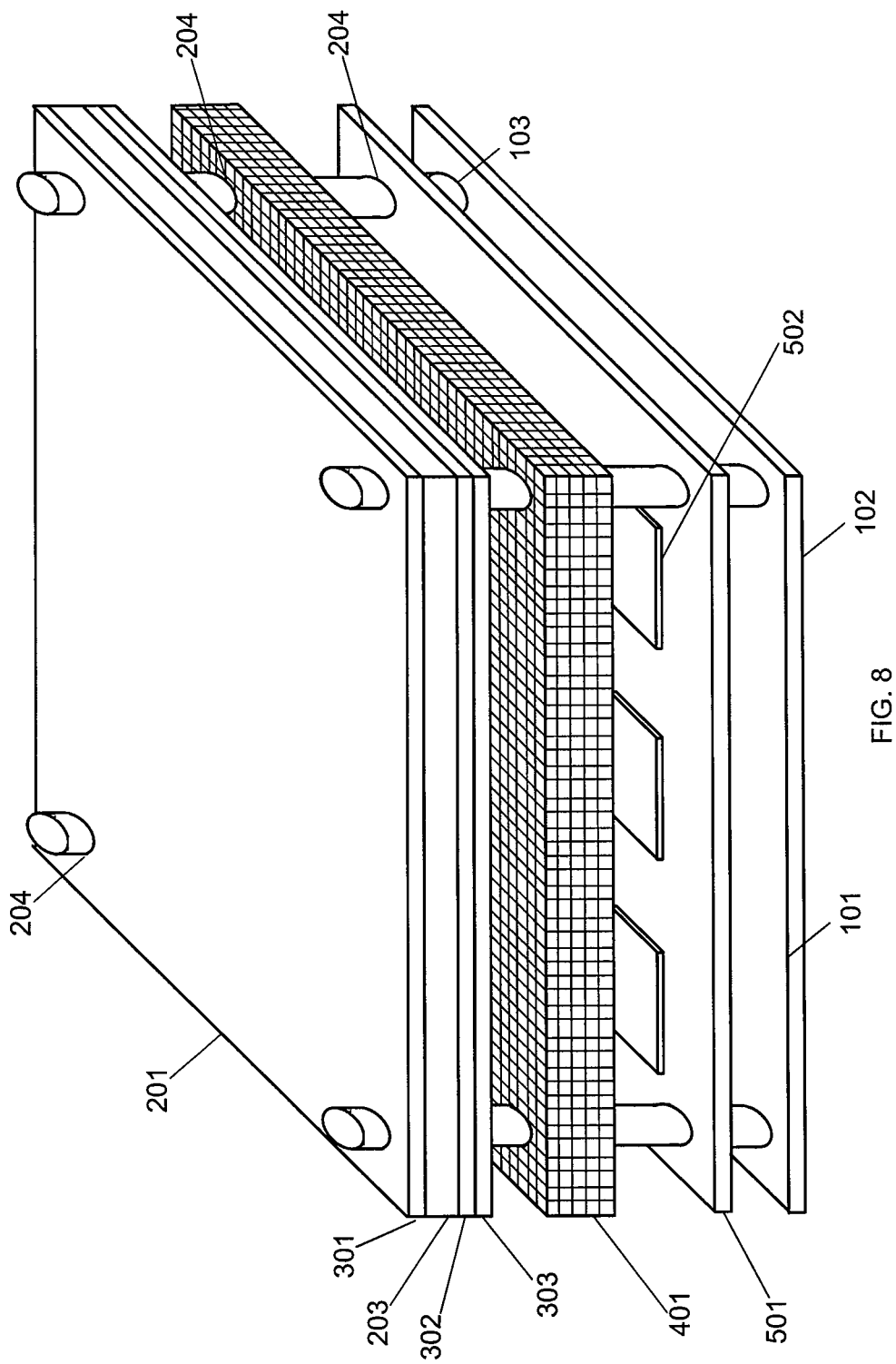
FIG. 8 depicts an exemplary assembly fixture with reflector patch sheet, solid foam spacer and first layer PCB with driver patches prior to assembly.
Figure 9:
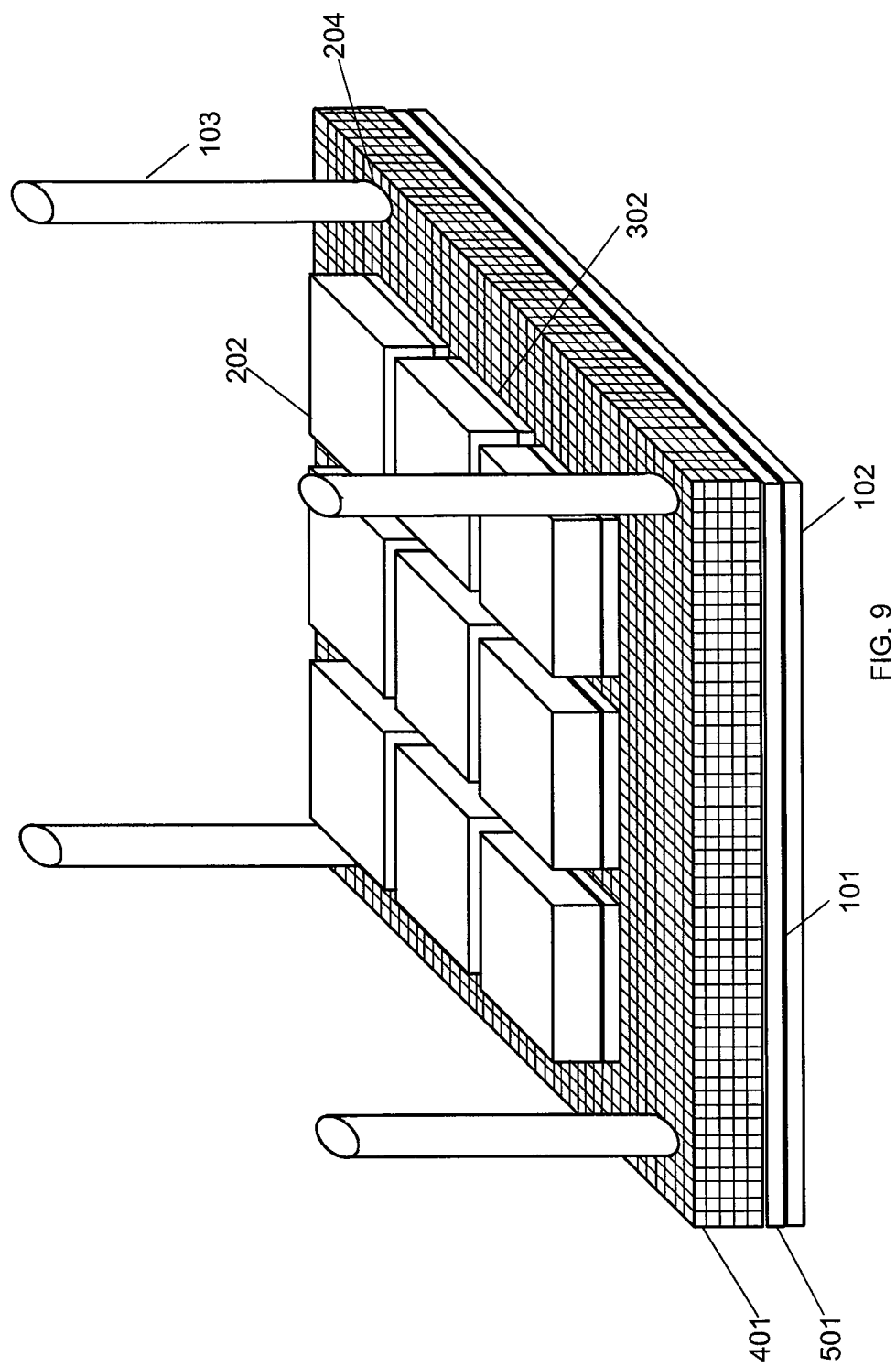
FIG. 9 depicts an exemplary antenna assembly fixture with reflector patch sheet, solid foam spacer and first layer PCB with driver patches after assembly.
Figure 10:
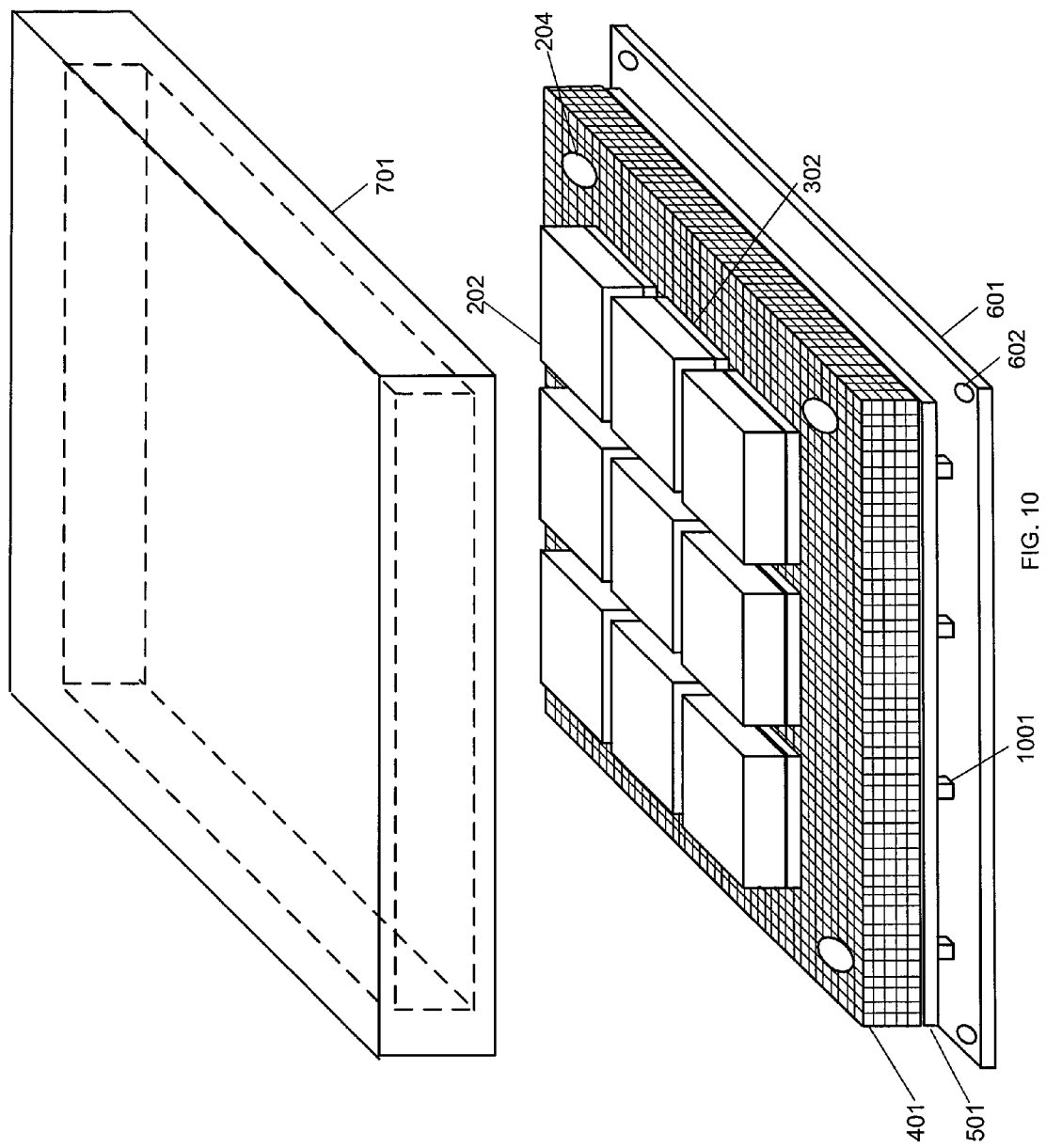
FIG. 10 depicts an exemplary partial satellite antenna attached to a base plate prior to attachment of a radome.
Figure 11:
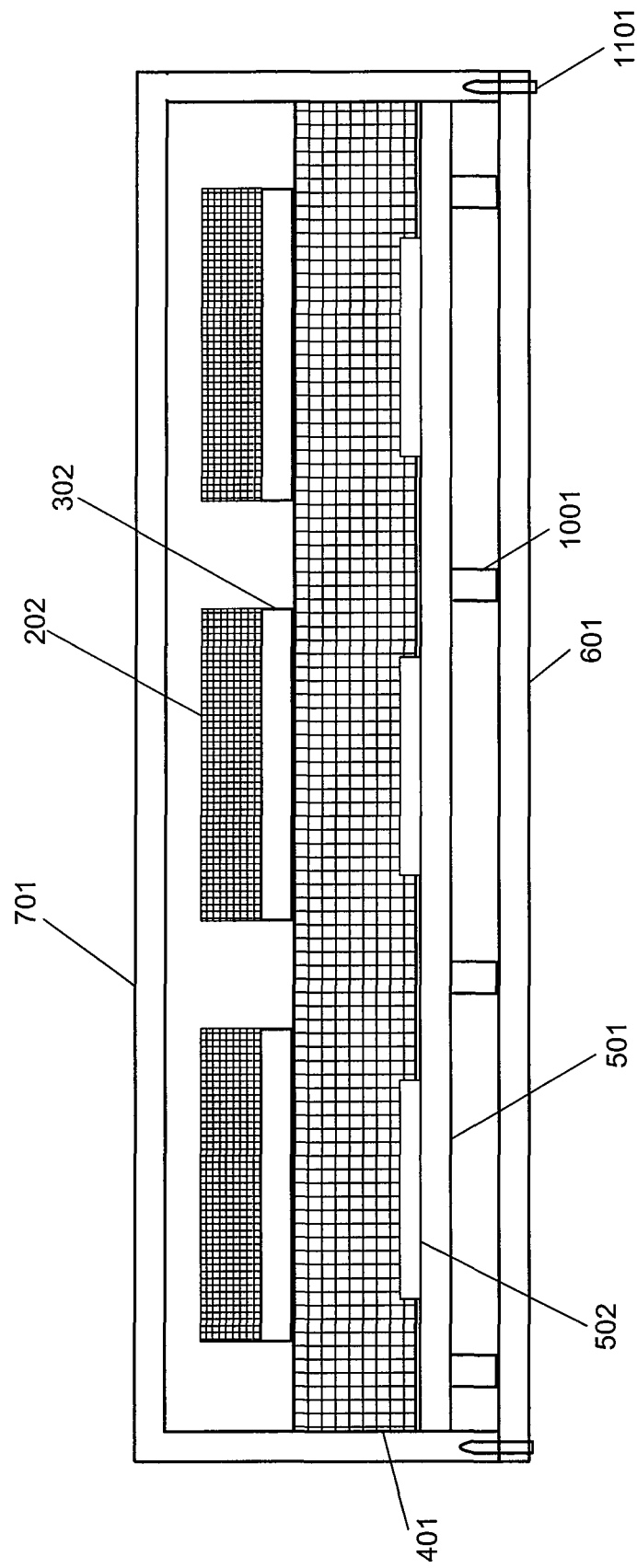
FIG. 11 depicts a cross section of an assembled satellite antenna.
Figure 12:
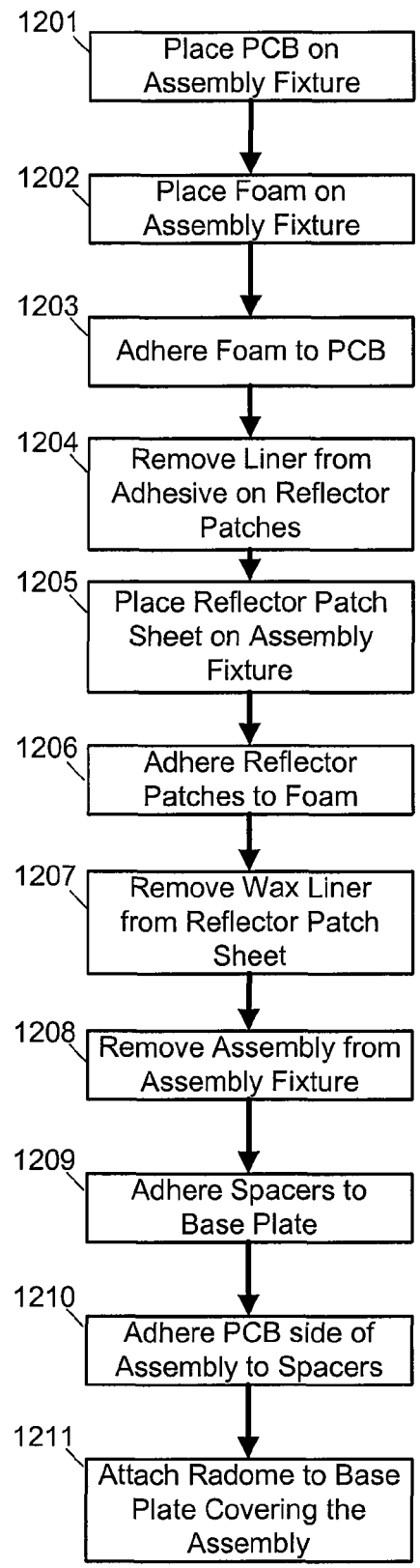
FIG. 12 depicts an exemplary procedure for assembly of a satellite antenna.

FIG. 8 depicts an exemplary assembly fixture with reflector patch sheet, solid foam spacer and first layer PCB with driver patches prior to assembly. FIG. 9 depicts an exemplary antenna assembly fixture with reflector patch sheet, solid foam spacer and first layer PCB with driver patches after assembly. FIG. 10 depicts an exemplary partial satellite antenna attached to a base plate prior to attachment of a radome. FIG. 11 depicts a cross section of an assembled satellite antenna. FIG. 12 depicts an exemplary procedure for assembly of a satellite antenna. In block 1201, the first layer PCB 501 may be placed on the assembly fixture 401. For example, as depicted in FIG. 8, the alignment holes 204 of the first layer PCB 501 may be lined up with the alignment poles 103 of the assembly fixture 101, and the first layer PCB 501 may be pushed down onto the assembly fixture 101.

In block 1202, the solid foam spacer 401 may be placed on the assembly fixture 401. For example, as depicted in FIG. 8, the alignment holes 204 of the solid foam spacer 401 may be lined up with the alignment poles 103 of the assembly fixture 101, and the solid foam spacer 401 may be pushed down onto the assembly fixture 101.

In block 1203, the solid foam spacer 401 may be adhered to the first layer PCB 501. For example, as depicted in FIG. 9, the solid foam spacer 401 may be pushed down the alignment poles 103 onto the first layer PCB 501. The adhesive on the bottom of the solid foam spacer 401 may adhere to the first layer PCB 501 and the driver patches 502, attaching the solid foam spacer 401 to the first layer PCB 501.

In block 1204, the adhesive carrier film 303 may be removed from the bottoms of the reflector patches 202 on the reflector patch sheet 101. For example, as depicted in FIG. 3b, only the portions of the adhesive carrier film 303 that are below the reflector patches 202 may be removed, leaving the portions of the adhesive carrier film 303 that are below the excess material 203 in place. This may ensure that the only the reflector patches 202 will be adhered to the solid foam spacer 401, as the presence of liner will prevent the double sided adhesive 302 the attachment of the excess material 203.

In block 1205, the reflector patch sheet 201 may be placed on the assembly fixture 101. For example, as depicted in FIG. 8, the alignment holes 204 of the reflector patch sheet 201 may be lined up with the alignment poles 103 of the assembly fixture 101, and the reflector patch sheet 201 may be pushed down onto the assembly fixture 101.

In block 1206, the reflector patches 202 may be adhered to the solid foam spacer 401. The reflector patch sheet 201, as depicted in FIG. 3b with the adhesive carrier film 303 removed from the reflector patches 202, may be pressed down onto the solid foam spacer 401. This may cause the double sided adhesive 302 to adhere the reflector patches 202 to the solid foam spacer 401, while leaving the excess material 203 not adhered.

In block 1207, the release liner 301 may be removed from the reflector patch sheet 201. For example, as depicted in FIG. 3c and FIG. 9, removing the release liner 301 may also remove the cut-outs 304, including the excess material 203. The reflector patches 202 may remain adhered to the solid foam spacer 401. This may allow the reflector patches 202 to maintain their shape and precise locations, which may result in lowered material costs and increased performance in the satellite antenna due to the precise alignment between the reflector patches 202 and the driver patches 502.

The first layer PCB 501, solid foam spacer 401, and reflector patch sheet 201 may be placed on the assembly fixture 101 in any suitable order. For example, the reflector patch sheet 201 may be placed on the assembly fixture 101 first, with the release liner 301 facing down, followed by the solid foam spacer 401 and the first layer PCB 501 with the driver patches 502 facing down.

In block 1208, the assembly of the first layer PCB 501, the solid foam spacer 401, and the reflector patches 202 may be removed from the assembly fixture 101. For example, as depicted in FIG. 9, once the first layer PCB 501, the solid foam spacer 401, and the reflector patches 202 have been attached together with adhesives, they form an assembly, which may be removed as one piece from the assembly fixture 101, for example, by sliding it up over the alignment poles 103.

In block 1209, spacers may be adhered to the base plate 601. The base plate 601 may include markings which may indicate where spacers 1001 should be attached to the base plate 601. The spacers 1001 may be made of any suitable material, such as, for example, plastic. Double sided adhesive may be attached to each side of the spacers 1001, and may be used to attach the bottom spacers 1001 to the base plate 601.

In block 1210, bottom of the first PCB layer 501 may be adhered to the top of the spacers 1001. The spacers 1001 adhered to the bottom of the first layer PCB 501, along with the rest of the assembly, in locations indicated by screen printed markers on the bottom of the first layer PCB 501. For example, as depicted in FIG. 10, the assembly of the first layer PCB 501, the solid foam spacer 401, and the reflector patches 202 may rest on top of, and be adhered to, the spacers 1001, which may in turn be adhered to the base plate 601. The spacers 1001 may allow for precise control of the separation between the base plate 601 and the first layer PCB 501, which may result in accurate separation and tight tolerance control between the feed network on the first layer PCB 501 and the base plate 601. The spacers 1001 may also counter the effect of PCB warping in the first layer PCB 501. Solder may be applied to attach the RF connector of the base plate 601 to the first layer PCB 501.

Alternatively, the spacers 1001 may be adhered to the first layer PCB 501 before being adhered to the base plate 601. The spacers 1001 may be adhered to the first layer PCB 501 while the first layer PCB 501 is still on the assembly fixture 101, or after the first layer PCB 501 has been removed from the assembly fixture 101.

In block 1211, the radome 701 may be attached to the assembly of the base plate 601, first layer PCB 501, solid foam spacer 401, and reflector patches 202. For example, as depicted in FIG. 10 and FIG. 11, the radome 701 may fit over and cover the first layer PCB 501, solid foam spacer 401, and reflector patches 202, and may rest on the base plate 601. Any suitable attachment mechanism may be used to attach the radome 701 to the base plate 601, including, for example, as depicted in FIG. 11, metal screws 1101, which may be threaded through the screw holes 602 in the base plate 601 and into the radome 701. A rubber O-ring may be placed in a groove in the bottom of the radome 701, and provide a seal between the radome 701 and the base plate 601.

Attaching the radome 701 to the base plate 601 may complete the assembly of the satellite antenna. As depicted in FIG. 11, in the completed antenna the first layer PCB 501, solid foam spacer 401, and reflector patches 202 may be housed in between the base plate 601 and the radome 701. The first layer PCB 501 may be separated from the base plate 601 by the spacers 1001, which may be attached with adhesive. The gap between the first layer PCB 501 and the base plate 601 may contain air. The solid foam spacer 401 may be adhered to the first layer PCB 501. The reflector patches 202 may be adhered to the top of the solid foam spacer 401 by the double sided adhesive 302, and may be aligned with the driver patches 502.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wire line varieties thereof, and/or any other computerized device capable of configuration for receiving, storing and/or processing data for standalone application and/or over a networked medium or media. Examples of communication media that can be employed include, without limitation, wireless data networks, wire line networks, and/or a variety of networked media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A method of assembling a satellite antenna comprising:
   placing a first layer PCB comprising a plurality of driver patches and at least one alignment hole on an assembly fixture comprising at least one alignment pole;
   placing a solid foam spacer comprising at least one alignment hole on the assembly fixture;
   pressing the solid foam spacer onto the first layer PCB to adhere the solid foam spacer to the first layer PCB;
   precutting through an adhesive carrier film, a double sided adhesive layer, and a reflector patch sheet in a shape of a plurality of separate reflector patches in the reflector patch sheet;
   removing a plurality of separate portions of the adhesive carrier film from the plurality of separate reflector patches of the reflector patch sheet, which includes at least one alignment hole;
   placing the reflector patch sheet on the assembly fixture;
   pressing the reflector patch sheet onto the solid foam spacer to adhere the plurality of separate reflector patches to the solid foam spacer; and
   removing a release liner from the top of the reflector patch sheet to remove excess material from the reflector patch sheet.

2. The method of claim 1, further comprising:
   removing the first layer PCB, the solid foam spacer, and the plurality of separate reflector patches from the assembly fixture.

3. The method of claim 2, further comprising:
   attaching a spacer to the bottom of the first layer PCB; and attaching the spacer to the top of a base plate.

4. The method of claim 3, wherein the spacer is attached to the first layer PCB and the base plate with an adhesive.

5. The method of claim 3, further comprising:
   attaching a radome to the base plate such that the radome covers the first layer PCB, the solid foam spacer, and the plurality of separate reflector patches.

6. The method of claim 5, wherein the radome is attached to the base plate with metal screws.

7. The method of claim 1, wherein the first layer PCB comprises a feed network.

8. The method of claim 1, wherein the plurality of driver patches are copper driver patches.

9. The method of claim 1, wherein the assembly fixture comprises four alignment poles arranged with one alignment pole at each corner of a base.

10. The method of claim 1, wherein the reflector patch sheet is aluminum.

11. An apparatus for assembling a satellite antenna comprising:
    an assembly fixture comprising at least one alignment pole attached to a base;
    a first layer PCB comprising a feed network, a plurality of driver patches, and at least one alignment hole positioned to align with the at least one alignment pole;
    a reflector patch sheet comprising a metal sheet with a plurality of etched separate reflector patches and at least one alignment hole positioned to align with the at least one alignment pole;
    a double sided adhesive layer adhered to the bottom of the reflector patch sheet and precut with a shape of the plurality of separate reflector patches and comprising at least one alignment hole positioned to align with the at least one alignment pole;
    an adhesive carrier film covering the bottom of the double sided adhesive layer and precut to include a plurality of separate portions of the adhesive carrier film with the shape of the plurality of separate reflector patches and comprising at least one alignment hole positioned to align with the at least one alignment pole;
    a release liner attached to the top of the reflector patch sheet and comprising at least one alignment hole positioned to align with the at least one alignment pole; and
    a solid foam spacer comprising at least one cavity and comprising at least one alignment hole positioned to align with the at least one alignment pole.

12. The apparatus of claim 11, further comprising a base plate.

13. The apparatus of claim 11, further comprising a radome.

14. The apparatus of claim 11, wherein the plurality of driver patches and the plurality of separate reflector patches are positioned such that each driver patch is aligned with one reflector patch when the at least one alignment hole of the reflector patch sheet is aligned with the at least one alignment hole of the first layer PCB.

15. The apparatus of claim 11, wherein the solid foam spacer comprises an adhesive.

16. The apparatus of claim 11, further comprising spacers, wherein the spacers comprise an adhesive on the top and bottom of the spacer.

17. The apparatus of claim 11, wherein the first layer PCB further comprises screen printed markings indicating locations for the placement of spacers.

* * * * *